United States Patent
Jürs et al.

(10) Patent No.: US 8,298,050 B2
(45) Date of Patent: Oct. 30, 2012

(54) APPARATUS AND METHOD FOR FILLETING BEHEADED AND GUTTED FISH

(75) Inventors: Michael Jürs, Haffkrug (DE); Hans Finke, Lübeck (DE); Manfred Brandt, Lübeck (DE)

(73) Assignee: Nordischer Maschinenbau Rud. Baader Gmbh + Co. KG, Lübeck (DE)

( * ) Notice: Subject to any disclaimer, the term of this patent is extended or adjusted under 35 U.S.C. 154(b) by 0 days.

(21) Appl. No.: 13/391,603

(22) PCT Filed: Apr. 19, 2011

(86) PCT No.: PCT/EP2011/056250
§ 371 (c)(1),
(2), (4) Date: Feb. 21, 2012

(87) PCT Pub. No.: WO2011/131680
PCT Pub. Date: Oct. 27, 2011

(65) Prior Publication Data
US 2012/0149290 A1  Jun. 14, 2012

(30) Foreign Application Priority Data
Apr. 21, 2010 (DE) .......................... 10 2010 018 057

(51) Int. Cl.
*A22B 5/20* (2006.01)
(52) U.S. Cl. ...................................... 452/162
(58) Field of Classification Search ................... 452/135, 452/160–163, 170
See application file for complete search history.

(56) References Cited

U.S. PATENT DOCUMENTS

| 2,917,772 | A | | 12/1959 | Schlichting |
| 5,413,525 | A | * | 5/1995 | Braeger et al. ................ 452/165 |
| 5,536,205 | A | * | 7/1996 | Braeger et al. ................ 452/161 |
| 6,280,313 | B1 | | 8/2001 | Braeger et al. |
| 6,322,437 | B1 | * | 11/2001 | Grabau et al. ................ 452/161 |
| 7,081,048 | B2 | * | 7/2006 | Bech ............................. 452/161 |
| 7,090,574 | B2 | * | 8/2006 | Braeger et al. ................ 452/162 |
| 7,927,194 | B2 | * | 4/2011 | Jurs et al. ..................... 452/135 |

FOREIGN PATENT DOCUMENTS
DE 1239827 11/1967
DE 3403771 12/1984

OTHER PUBLICATIONS

International Search Report for PCT/EP2011/056250 mailed Sep. 14, 2011.

* cited by examiner

*Primary Examiner* — Richard Price, Jr.
(74) *Attorney, Agent, or Firm* — Workman Nydegger

(57) ABSTRACT

The invention relates to an apparatus for filleting beheaded and gutted fish, comprising a cutting unit for filleting the fish, wherein the cutting unit has at least one pair of circular blades, an endlessly rotating transport conveyor having at least one saddle-shaped supporting body for receiving the fish and conveying them through the cutting unit tail first, wherein each supporting body has a supporting edge for making a form-locking connection with the center bone of the fish to be processed, and a device for centering the center bone in relation to the supporting body, which is distinguished in that a means for lifting the center bone of the fish off the supporting edge of the supporting body is provided, which is arranged in the region of the device for centering the center bone. Furthermore, the invention relates to a corresponding method.

16 Claims, 9 Drawing Sheets

APPARATUS AND METHOD FOR FILLETING BEHEADED AND GUTTED FISH

CROSS-REFERENCE TO RELATED APPLICATIONS

This application is a National Stage Application of PCT/EP2011/056250, filed Apr. 19, 2011, which designates the United States and claims the priority of German patent application DE 10 2010 018 057.2, filed on Apr. 21, 2010, the subject matter of which is incorporated herein by reference.

BACKGROUND OF THE INVENTION

The invention relates to an apparatus for filleting beheaded and gutted fish, comprising a cutting unit for filleting the fish, wherein the cutting unit has at least one pair of circular blades, an endlessly rotating transport conveyor having at least one saddle-shaped supporting body for receiving the fish and conveying them through the cutting unit tail first, wherein each supporting body has a supporting edge for making a form-locking connection with the centre bone of the fish to be processed, and a device for centring the centre bone in relation to the supporting body.

Furthermore the invention relates to a method for filleting beheaded and gutted fish, having the steps of: transporting a fish resting with its centre bone on a supporting edge of a supporting member with the back at the top, tail first through an apparatus for filleting fish, wherein during transport the dorsal bones are cut free by means of a pair of circular blades.

Apparatuses and methods of this kind are used in the fish-processing industry to separate the fillets from the skeleton of the fish. To be more precise, the ventral belly spokes and/or the dorsal back spokes are cut free. To cut the spokes free, it is necessary for the fish, which are usually transported tail first and with the back at the top, to be delivered to the cutting apparatus in centred fashion. For this, the beheaded and gutted fish are mounted on supporting bodies, the so-called transport saddles. So that the fish stay on the transport saddles, the upper side of the transport saddles is provided with a supporting edge. Usually, the transport saddles on their upper side have teeth which catch in the centre bone of the fish and so form a form-locking connection. For some fish species, it is sufficient to provide one row of teeth. In particular salmonid fish species have a centre bone in which, in the region of the belly cavity, the rib appendages extend from the centre bone at a narrow angle over the whole length of the centre bone uniformly, so that the teeth catch centrally under the centre bone. The rib appendages projecting narrowly from the centre bone form, as it were, a guide, so that the centre bone always rests centrally on the supporting edge of the supporting body. In other words, the rib appendages prevent the centre bone from slipping off the supporting body. By means of the centring device, which usually comprises a pair of flaps which can move towards and away from each other in synchronisation, the fish can then be finely centred for the cutting process.

Other fish species, in particular the white fish species, have a centre bone having a shape which varies over the length. To put it another way, in the region of the belly cavity the position of the rib appendages relative to the centre bone varies from the tail end of the belly cavity towards the head end of the belly cavity. While the rib appendages at the tail end of the belly cavity have a similar orientation relative to the centre bone to the salmonid fish species, namely at a narrow angle to the centre bone, this position varies towards the head, such that the rib appendages in the region of the head end of the belly cavity extend from the centre bone at a wide angle, namely almost horizontally. As a result of this shape of the centre bone or, to be more precise, the orientation of the rib appendages, when mounted on the transport saddle the centre bone leans to one of the two sides of the row of teeth, as the supporting or guiding function of the closely adjacent rib appendages is missing. In other words, the centre bone tilts away from the row of teeth in the region of the rib appendages laterally extending from the centre bone, so that fine centring by the centring device is made difficult. The consequence is incorrect cuts to the fillet. For this reason, transport saddles which have a double row of teeth have been used for such fish species.

A transport saddle of this kind is known e.g. from DE 34 03 771 C1. By this means the centre bone can be mounted in such a way that the centre bone lies centrally between the two rows of teeth. However, a transport saddle with two rows of teeth has considerable drawbacks. Due to the required thickness of a transport saddle of this kind transversely to the direction of transport T, such a transport saddle forms an obtrusive contour for various units. A further drawback lies in that the cutting unit or the circular blades cannot cut close enough to the skeleton, so that the uncut regions of the fillet are torn from the skeleton.

SUMMARY OF THE INVENTION

It is therefore the object of the invention to provide a simple and cheap apparatus for filleting fish which allows improved centring of the fish.

This object is achieved by an apparatus having the characteristics mentioned hereinbefore, by the fact that a means for lifting the centre bone of the fish off the supporting edge of the supporting body is provided, which is arranged in the region of the device for centring the centre bone. Due to the lifting-off means according to the invention, the trunk of the fish or, to be more precise, the centre bone can be actively or passively partially or completely disengaged from the supporting body, so that the centring device can centre the centre bone of a fish independently of its shape centrally in relation to the supporting body. To put it another way, due to the lifting off, the form-locking between the supporting body and the centre bone is at least partially released, so that the centre bone is freely movable at least in the region of lifting off. In particular, white fish species of which the centre bones previously necessitated the use of a double-row supporting body can now also be processed with a single-row supporting body. The cutting quality and yield of fillet cuts are greatly improved with the design according to the invention. Also, incorrect cuts—caused by incorrect centring—can be reduced or completely avoided, because all fish species which can be positioned on a transport saddle can be finely centred immediately before the separating process.

An appropriate development of the invention is distinguished in that the cutting unit comprises a lower pair of circular blades for cutting free the ventral belly bones and an upper pair of circular blades for cutting free the dorsal back bones, wherein the upper pair of circular blades is arranged behind the lower pair of circular blades in the direction of transport T of the fish tail first, and the means for lifting the centre bone off is a means for lifting the centre bone and extends on both sides of the lower pair of circular blades in the direction of transport T from the lower pair of circular blades to the upper pair of circular blades. Due to the design of the lifting-off means as a lifting means, the centre bone can be actively and specifically released from the teeth of the supporting body, to initiate the centring operation.

Advantageously, the means for lifting the centre bone off comprises two guide elements which each have a raised area to form an uneven guide surface, wherein the raised area protrudes beyond the supporting edge of the supporting body in the direction of the device for centring the centre bone. This construction is mechanically particularly simple and effective, as the fish placed on the supporting body automatically follow the contour of the guide elements or their guide surfaces. Due to the paired arrangement of the guide elements, namely one guide element on each side of the supporting body or of the pair of circular blades, uniform and synchronous guiding of the fish and in particular of the centre bone of the fish is ensured.

A further preferred development of the invention is characterised in that the means for lifting the centre bone off comprises two guide elements which are each designed planar in the direction of transport T to form a completely planar guide surface, and cooperate with the supporting body in such a way that the supporting edge of the supporting body has a single-row tooth arrangement, wherein the height of the teeth in the front region of the supporting body, seen in the direction of transport T, is greater than in the rear region, so that the teeth of the rear region lie below the plane spanned by the guide surfaces. As a result, passive separation of the centre bone from the supporting body can be carried out, as the centre bone with its rear region pointing towards the head of the fish runs, as it were, onto the guide surfaces, while the teeth of the front region pointing towards the tail continue to catch on the centre bone and ensure transport. This construction is particularly suitable for retrofitting existing apparatuses with available guide elements, because only the transport saddle has to be exchanged, by using a transport saddle with a tooth height decreasing from front to back in relation to the direction of transport T.

Preferably, the lifting-off means is movable up and down. With this design according to the invention, there is a further possibility of releasing the centre bone from engagement with the supporting body.

The object is also achieved by a method having the steps mentioned hereinbefore, by the fact that the centre bone of the fish is lifted off the supporting edge of the supporting body before the dorsal back bones are cut free, and then centred centrally to the supporting edge. The resulting advantages have already been described in connection with the apparatus, so that reference is made to the corresponding passages to avoid repetition.

BRIEF DESCRIPTION OF THE DRAWINGS

Further appropriate and/or preferred features and developments are apparent from the subsidiary claims and the description. A particularly preferred embodiment of the invention is described in more detail with the aid of the attached drawings. The drawings show:

BRIEF DESCRIPTION OF THE EMBODIMENTS

Figure 1:
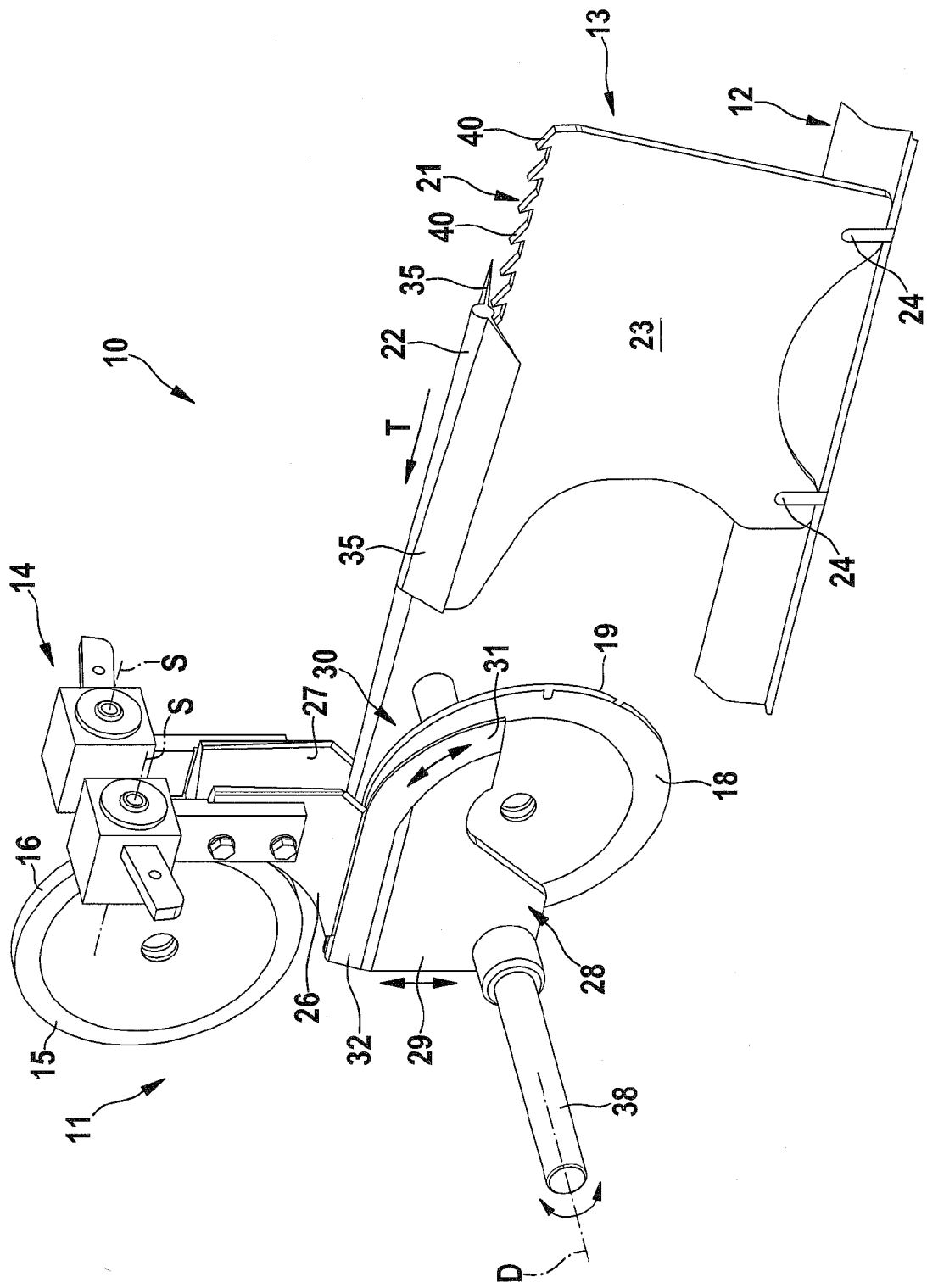
FIG. 1 a schematic perspective view of an apparatus according to the invention, with a supporting body entering the cutting unit, the means for lifting the centre bone off being formed by movable guide elements, FIG. 2 the apparatus according to FIG. 1 with the supporting body having passed almost completely through the cutting unit, FIG. 3 a front view of the apparatus according to FIG. 1, FIG. 4 a further embodiment of the apparatus according to the invention in a perspective view, the lifting-off means being formed by guide elements with corresponding raised areas, FIG. 5 details of a further embodiment of the apparatus according to the invention, the lifting-off means being formed by a movable guide rocker, FIG. 6 a transport saddle with teeth of which the height decreases from front to back in the direction opposite the direction of transport T, FIG. 7 a schematic view of a skeleton of a white fish species in a section in the region of the seventh vertebra, FIG. 8 a schematic side view of an apparatus according to the invention with two pairs of circular blades arranged one above the other, wherein the device for centring the centre bone itself forms the means for lifting the centre bone off, and FIG. 9 the apparatus according to FIG. 8 in a front view.

The apparatus shown in the drawings serves to cut fillets from a beheaded and gutted fish trunk. The apparatus is constructed and designed to process different fish species, in particular salmonid fish species and white fish species. Naturally, the apparatus can also be used to cut free exclusively the dorsal bones or the ventral bones.

Figure 3:
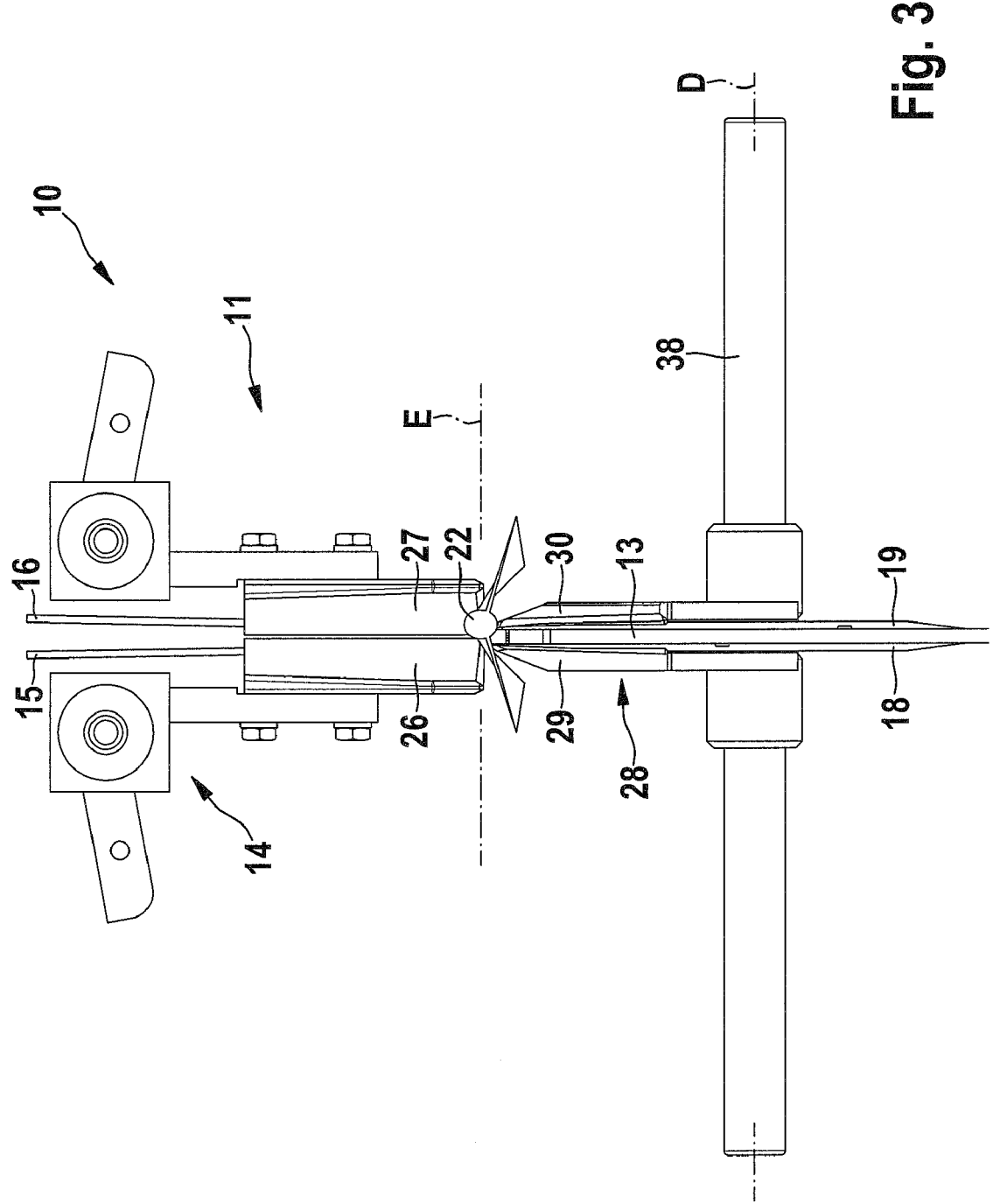

The apparatus 10 for filleting beheaded and gutted fish comprises in the usual manner a cutting unit 11, an endlessly rotating transport conveyor 12 with at least one supporting body 13, and a device 14 for centring the fish in relation to the supporting body 13. The cutting unit 11 for filleting the fish has at least one pair of circular blades 15, 16. The rotatable pair of circular blades 15, 16 is constructed and designed in the known manner to cut free the dorsal back bones, namely is arranged above the plane of transport E formed by the or each rotating supporting body 13, and spaced apart from each other. Usually the cutting unit 11 comprises a second pair of circular blades 18, 19 for cutting free the ventral belly bones. The second pair of circular blades 18, 19 is constructed to match the first pair of circular blades 15, 16 and arranged below the plane of transport E (see e.g. FIG. 3). In the direction of transport T of the fish, which are transported tail first through the cutting unit 11, the lower pair of circular blades 18, 19 for cutting the ventral fillets is arranged in front of the upper pair of circular blades 15, 16 for cutting the dorsal fillets (see e.g. FIG. 1). Optionally, the pairs of circular blades 15, 16; 18, 19 can also be arranged one above the other, without staggering in the direction of transport T (see e.g. FIG. 8).

The endlessly rotating transport conveyor 12 preferably comprises several supporting bodies 13. These saddle-shaped supporting bodies, which are also referred to as transport saddles, are arranged stationarily but releasably on the transport conveyor 12 and rotate with it. The supporting bodies 13 are constructed and designed to receive the fish. Due to driving of the transport element 12, the fish mounted on the supporting body 13 can be transported through the cutting unit 11. To fix the fish on the supporting body 13, the latter has a supporting edge 21 on the upper side. This supporting edge 21 is designed to make a form-locking connection with the centre bone 22 of the fish to be processed. The supporting body 13 has a support ridge 23. The support ridge 23 has means 24 for fixing it to the transport conveyor 12. At its upper edge are arranged e.g. spikes or teeth 40 which preferably extend over the whole length of the support ridge 23. The teeth 40 can be formed in two rows and preferably in a single row. In front in the direction of transport T, the support ridge 23 leads into a nose or protrusion 25. The orientation of the teeth 40 is variable. Preferably, the teeth 40 are inclined in the direction of transport T. Only the teeth 40 in the region of the protrusion 25 are, in the embodiment shown, inclined in the direction opposite the direction of transport T. Naturally, other arrangements and inclinations of the teeth 40 are possible. The thickness of the support ridge 23 is selected such that the support ridge 23 can be transported through between the pair of circular blades 18, 19 spaced apart from each other.

As mentioned, the lower pair of circular blades 18, 19 which enters the fish or the open belly cavity below the centre bone 22 is preferably arranged in front of the upper pair of circular blades 15, 16 in the direction of transport T, wherein the upper pair of circular blades 15, 16 cuts into the back of the fish from above and outside. Above the lower pair of circular blades 18, 19 and in front of the upper pair of circular blades 15, 16 in the direction of transport T is arranged the device 14 for centring the fish. The device 14 usually comprises two centring flaps 26, 27 which are pivotable in synchronisation each about a pivot axis S, so that the distance between the two centring flaps 26, 27 is variable. Such apparatuses 10, which have been described before, are basically known, so that a more detailed description is dispensed with. There is also the possibility of the pairs of circular blades 15, 16; 18, 19 being arranged directly one above the other, so that the circular blades 15, 16, 18, 19 engage in the trunk of the fish simultaneously. With such an arrangement, as can be seen from FIGS. 8 and 9, the device 14 for centring the centre bone 22 is arranged in front of the cutting unit 11 in the direction of transport T.

Associated with these apparatuses 10 described above, according to the invention, is a means for lifting the centre bone 22 of the fish off the supporting edge 21 of the supporting body 13. This means is arranged in the region of the device 14 for centring the centre bone 22. Preferably, the means is arranged below the centring device 14. As a result, the action of the means releases the fish from the form-locking connection with the supporting body 13, so that the centring flaps 26, 27 have free access to the fish which is then partially unguided or anchorless, in order to centre it. Lifting off of the fish describes any separation or release of the centre bone 22 from the supporting body 13, irrespective of whether the centre bone 22 is disengaged from the teeth 40 of the supporting body 13 actively, e.g. by control of an actuating element to alter the position of the centre bone 22, or passively, e.g. by forced guidance of the centre bone 22.

In a first embodiment, the lifting-off means is a lifting means 28. The means 28 can be formed e.g. by guide elements 29, 30. On both sides of the lower pair of circular blades 18, 19 in this embodiment is arranged a guide element 29 or 30 which, in the direction of transport T, preferably extends from the lower pair of circular blades 18, 19 to the upper pair of circular blades 15, 16. Each guide element 29, 30 is preferably constructed in one piece, but can of course also be constructed in several pieces. Each guide element 29, 30 has a circle segment-shaped section 31 and a linear section 32, wherein the linear section 32 runs parallel to the direction of transport T. The linear section 32 forms a guide surface for the fish or the centre bone 22.

Figure 4:
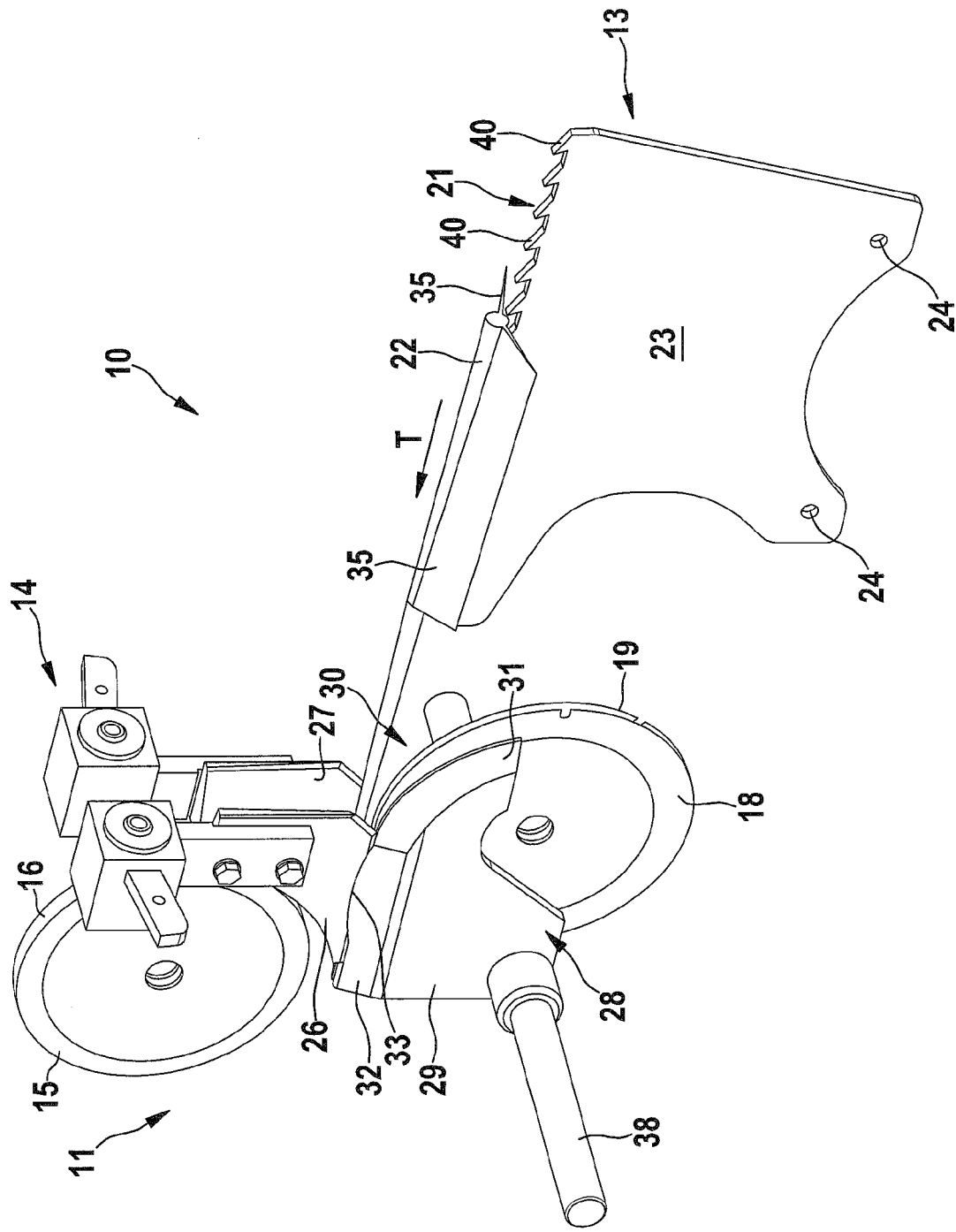

To lift the centre bone 22, the invention now proposes different options. Firstly, each guide element 29, 30 can have a raised area 33 to form an uneven guide surface (see e.g. FIG. 4). This raised area 33 protrudes beyond the supporting edge 21 of the supporting body 13 in the direction of the centring device 14. To be more precise, the upper edge of the raised area 33 lies above the upper edge of the supporting edge 21 formed by the teeth 40. To put it another way, the centre bone 22 rests on the raised area 33 in the region of the latter, while the centre bone 22 seen in the direction of transport T rests on the teeth 40 at least behind the raised area 33. Therefore as soon as the fish to be processed with the supporting body 13 passes the region of the raised area 33, the raised area 33 releases the connection between centre bone 22 and supporting edge 21, while the fish or centre bone 22 is operatively connected to the supporting edge 21 in the other regions of the guide elements 29, 30.

The raised area 33 is preferably formed or arranged in the linear section 32 of the guide elements 29, 30. The raised area 33 can be constructed in one piece with the guide element 29, 30, and so form an integral part. Furthermore, the raised area 33 can also be an element releasably attached to the guide element 29, 30 for altering the topography of the guide surface. In the direction of transport T, the raised area 33 can extend over part of the length of the linear section 32. In embodiments not shown, the raised area can also act only at a certain point or extend from the circle segment-shaped section 31 to the region of the linear section 32.

Figure 2:
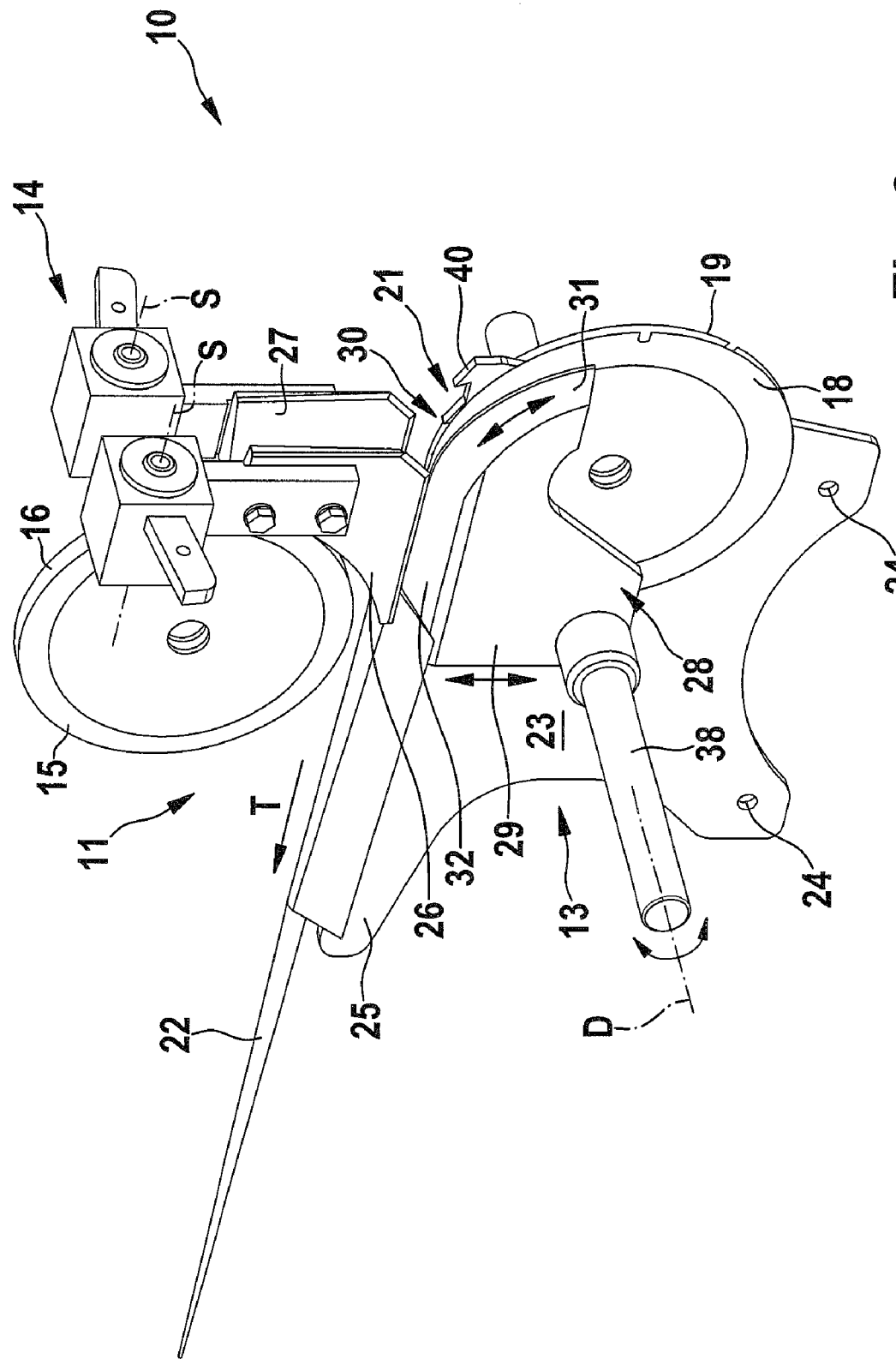
Figure 5:
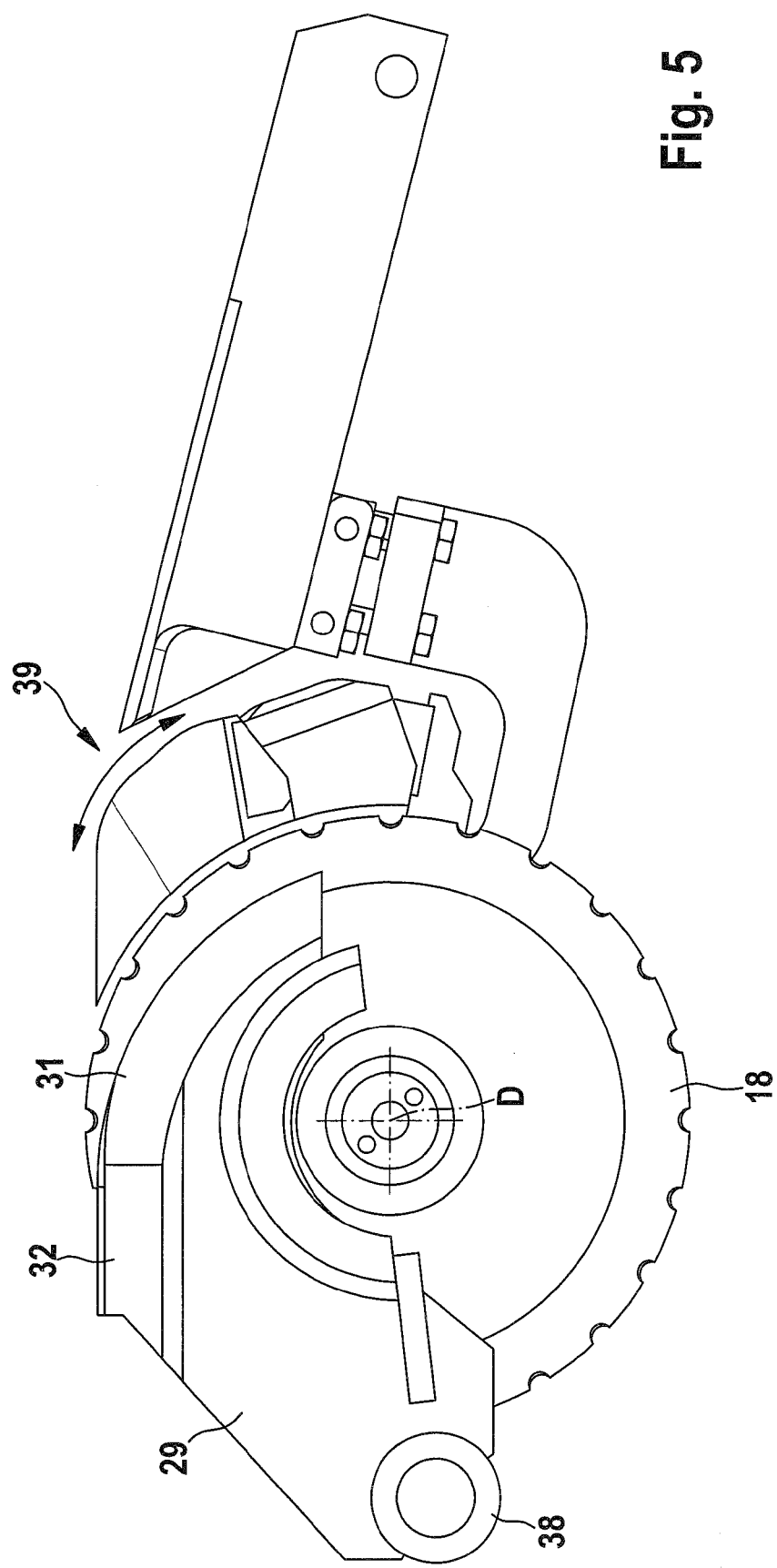

The lifting means 28 or the guide elements 29, 30 which form the means 28 can be designed to be movable up and down independently of the topography of the guide surface (see e.g. FIGS. 1 and 2). In further embodiments, other components which form the means 28 such as e.g. a guide rocker 39 arranged in front of the lower pair of circular blades 18, 19 in the direction of transport T of the fish (see e.g. FIG. 5) can also be designed to be movable up and down for lifting the centre bone 22. For this purpose the elements which are movable up and down can be assigned e.g. a drive for a linear movement, a drive for a rotational or pivot movement about an axis of rotation D, a pneumatic cylinder, a spring element with stop or any other common actuating member. The means 28, that is, e.g. the guide elements 29, 30 or other components forming the means 28, can be controllable individually for altering their position. Due to the linear and/or rotational movement the guide elements 29, 30 or the other components which form the means 28 are movable upwards off the supporting edge 21 beyond the plane of transport E, with limits in space and time. To perform the movements, different options are available. Thus e.g. the guide elements 29, 30 can be rotated relative to a shaft 38. But the guide elements 29, 30 can also be mounted on the shaft 38 non-rotatably, so that rotation of the shaft itself leads to a change of position. Preferably the guide elements 29, 30 or the corresponding components are synchronised in their controllable movement, so that the centre bone 22 is lifted synchronously and symmetrically to the centre bone 22 and set back down on them on both sides.

In a further embodiment of the invention the supporting body 13 has a special significance. In an apparatus 10 as described above, the means for lifting the centre bone off can also be formed by an operative connection between the guide elements 29, 30 and the supporting body 13. For this purpose the guide elements 29, are made planar to form a completely planar guide surface. In other words, the guide elements 29, 30 are free from raised areas. Corresponding to this, the supporting body 13 at its supporting edge 21 has teeth 40 of which the height decreases rearwardly, starting from the front region in the direction of transport T (see e.g. FIG. 7). To put it another way, the leading teeth 40 are higher than the trailing teeth 40, such that the teeth 40 in the rear region lie below the plane spanned by the guide surfaces. While the fish with its centre bone 22 in the region of the tail, which is in front, rests permanently on the supporting edge 21, the centre bone 22 in the region of the head is released from the supporting edge 21 by running onto the guide surfaces located above the supporting edge 21. Preferably the supporting body 13 in this embodiment has a single row of teeth. However, the supporting body 13 can also be provided with two parallel, spaced-apart rows of teeth.

Figure 8:
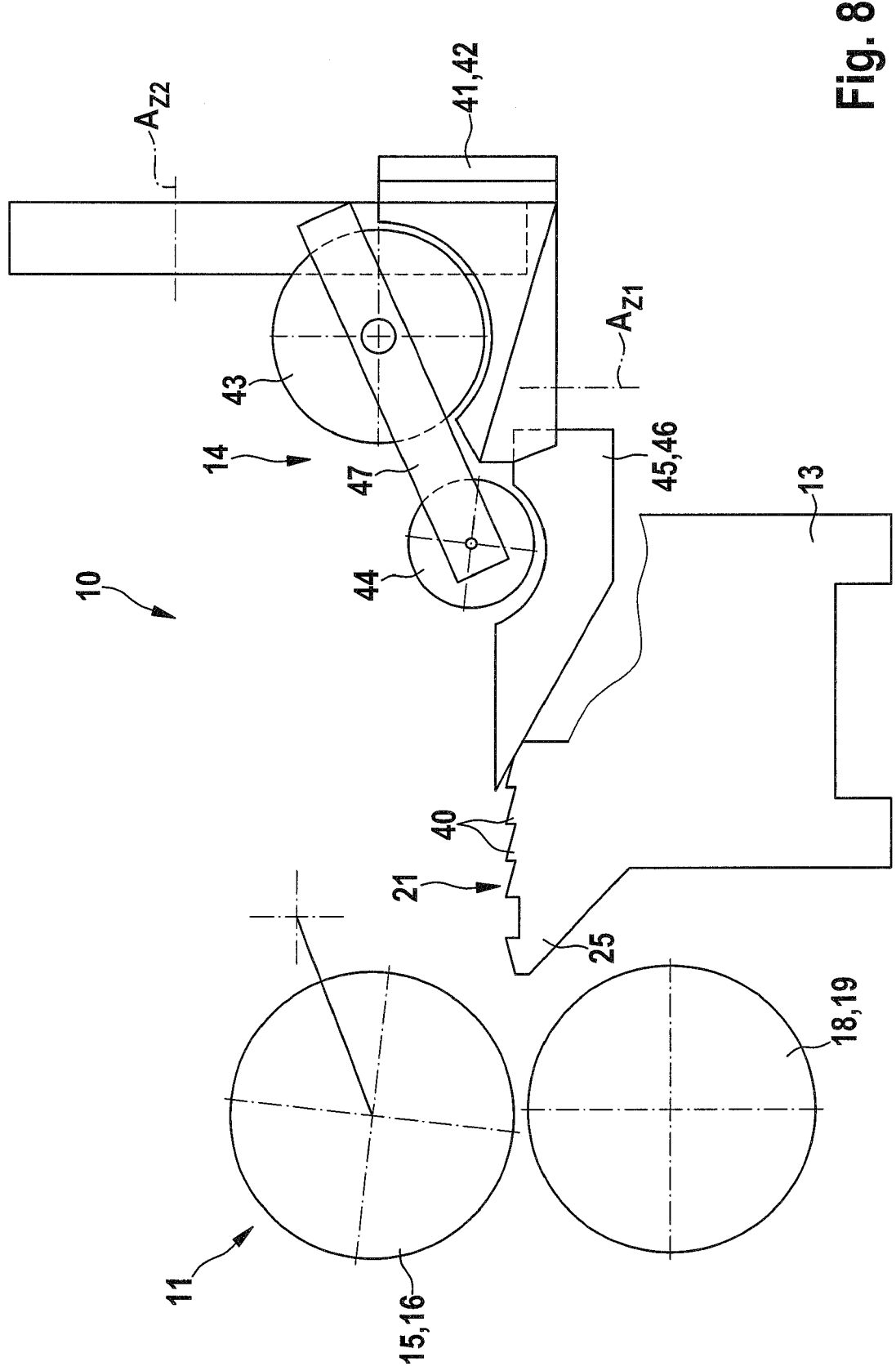
Figure 9:
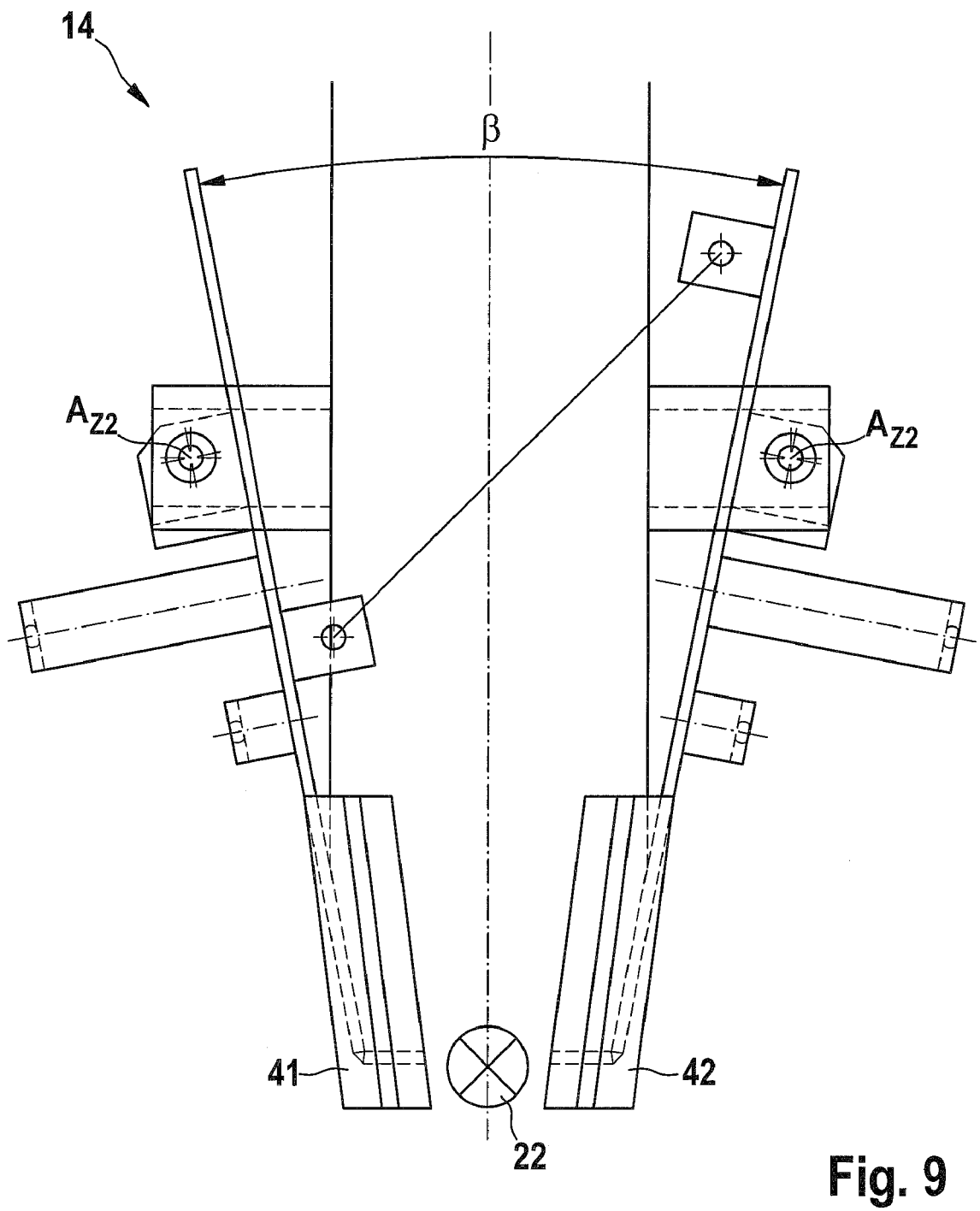

In the embodiment as in FIGS. 8 and 9, the device 14 comprises a first pair of lateral centring flaps 41, 42, at least one centring roller 43, at least one holding roller 44, and a second pair of lateral centring flaps 45, 46. Preferably, however, two centring rollers 43 and two holding rollers 44 are provided. The centring rollers 43 and the holding rollers 44 are arranged on a common pivot arm 47. The pair of centring flaps 45, 46 is pivotable via a carrier, not shown, about an axis $A_{Z1}$ oriented vertically to the plane of transport. The pair of centring flaps 41, 42 is pivotable about a horizontal axis $A_{Z2}$. Both the centring rollers 43 and the holding rollers 44 act from above on the fish trunk located on the supporting body 13. Both the centring rollers 43 and the holding rollers 44 are shaped conically or frustoconically and in each case lie opposite each other in pairs, so that the trunk of the fish is guided centrally between the centring rollers 43 and held between the holding rollers 44.

The first pair of lateral centring flaps 41, 42 is simultaneously constructed as a means for lifting the centre bone 22 off the supporting body 13. In other words, the device 14 itself is the lifting-off means. The centring flaps 41, 42 have an upwardly opening arrangement. To put it another way, the two spaced-apart centring flaps 41, 42 are not parallel, but at an angle β to each other (see in particular FIG. 9). The angle β is preferably between 1° and 5°, but can also be greater than 5°. Due to the distance between the centring flaps 41, 42, which increases upwardly, starting from the plane of transport, during transport on the supporting body 13 the trunk of the fish is lifted off the centre bone 22 by the lateral centring flaps 41, 42. The subsequent centring rollers 43 further erect the trunk of the fish and centre it. The second pair of lateral centring flaps 45, 46 holds and centres the trunk of the fish on the supporting body 13, while the holding rollers 44 push the trunk of the fish downwards, so that the trunk of the fish lies centrally and stationarily on the supporting edge 21 of the supporting body 13. The device 14 can be followed by at least one fin erector, not shown explicitly, while it is still before the cutting unit 11 in the direction of transport T. Preferably, however, two fin erectors are provided. These fin erectors act after the holding rollers 44, before the trunk of the fish is delivered to the cutting unit 11. This device 14 acts, as in the embodiments described above, preferably in the region of the supporting body 13, that is, in the region of the belly cavity of the trunk of the fish.

Figure 6:
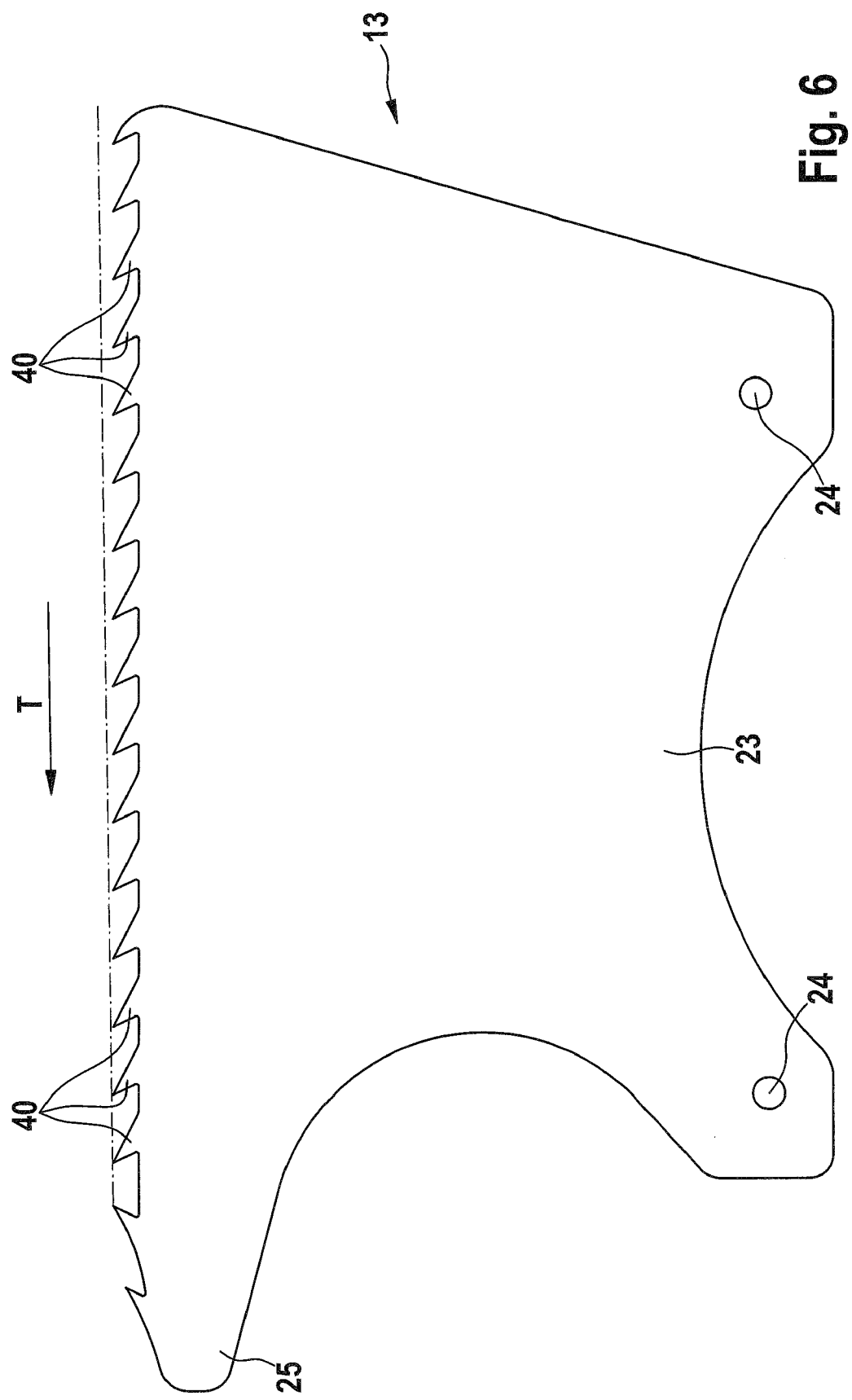

In further embodiments not shown explicitly, form-locking between the supporting body 13 and the centre bone 22 can also be produced by other surface designs such as e.g. knobs or the like. There is also the possibility of the fish being held on the supporting body 13 by force-locking, this force-locking being released to lift the centre bone 22. The embodiments described above can also be combined with each other. Thus there is e.g. the possibility of combining the embodiment as in FIG. 4 with a supporting body 13 as shown in FIG. 6. Also the fish can be released from the supporting edge 21 in a body over the whole length of the centre bone 22 by suitable design of the raised area 33 and/or specific control of the guide elements 29, 30 or other components forming the means 28.

Figure 7:
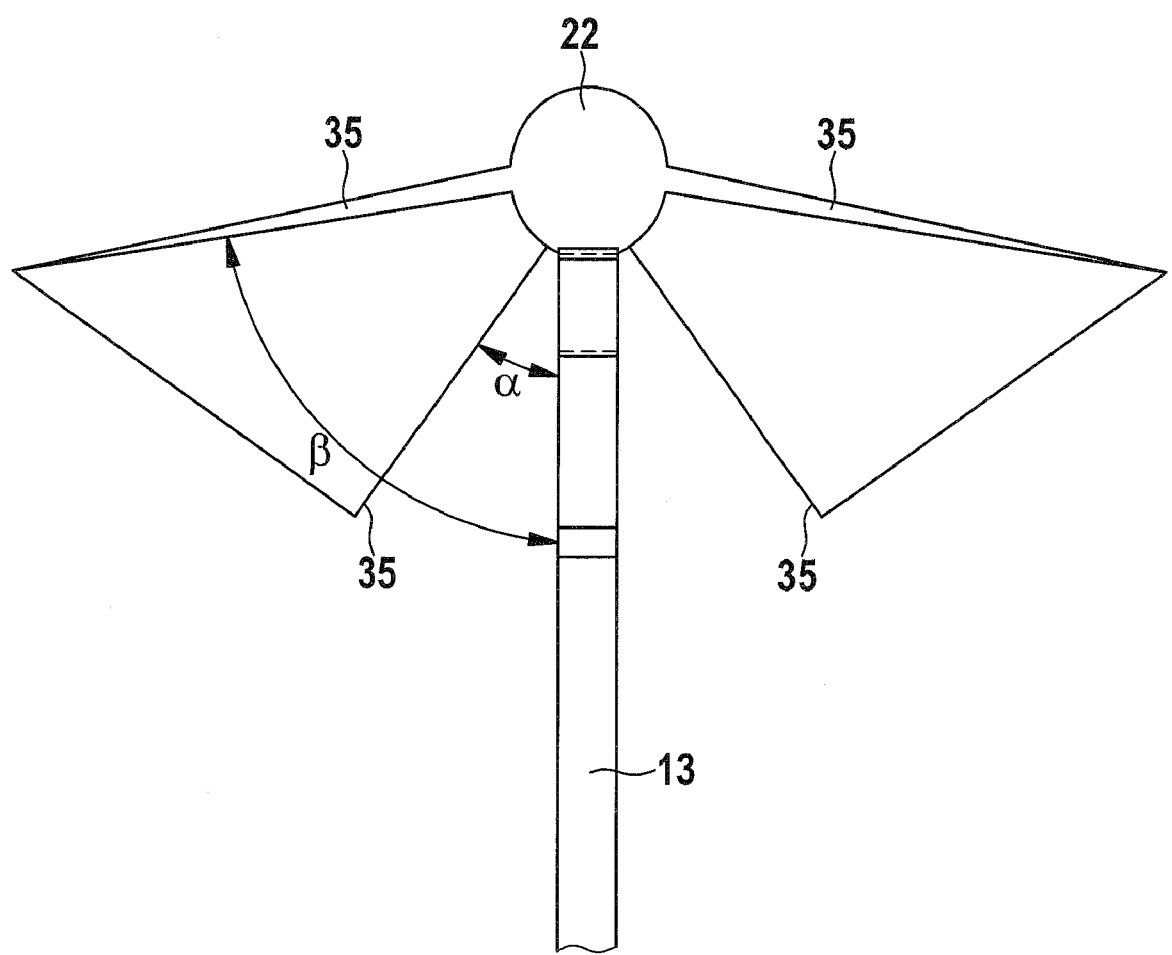

In FIG. 7 is shown schematically once again the skeleton of a white fish species, sectioned in the region of the seventh vertebra. The rib appendages 35 start from the centre bone 22. In the tail region of the belly cavity, the rib appendages 35 are at a narrow angle α to the centre bone 22. In the direction of the head, this angle increases. In the head region of the belly cavity the rib appendages 35 project almost laterally from the centre bone 22, and so are at a wide angle β to the centre bone 22. In the region of angle α the rib appendages 35 prevent the centre bone 22 from slipping off the supporting body 13. In the region of angle β this guiding function is missing, so that the centre bone 22 can slip left or right from the supporting body 13. This slipping of the centre bone 22 is also assisted by further anatomical peculiarities such as e.g. a centre bone 22 protruding downwardly or the like.

Below, the principle of the method is described in more detail with the aid of the attached drawings. An operator lays the gutted and beheaded fish on the supporting body 13 with the open belly cavity at the bottom, so that the fish lies with its tail region in front at the beak 25 of the supporting body 21. The trunk of the fish then lies with preliminary centring with the centre bone 22 on the teeth 40 of the supporting edge 21, so that a form-locking connection is made between the centre bone 22 and the teeth 40, wherein it can happen that the centre bone 22 lies adjacent to the supporting edge 21 due to the geometrical/anatomical peculiarities and/or the arrangement of the rib appendages in particular in the direction of the head of the fish. The trunk of the fish is then transported by means of the supporting body 13 through the cutting unit 11. First of all, the circular blades 18, 19 separate the ventral fillets from the skeleton (cutting free of the ventral belly bones), by the fact that the supporting body 13 is transported through between the circular blades 18, 19.

After cutting free the ventral belly bones, the centre bone 22 is for a short time lifted off the teeth 40. As a result the centre bone 22 is disengaged from the teeth 40, so that the centre bone 22 and hence the trunk of the fish are free. At this moment it is possible to finely centre the trunk of the fish, which is possibly not fully centred, by moving the centring flaps 26, 27 towards each other synchronously. In other words the trunk of the fish, which possibly lies not centrally on the supporting body 13, is lifted and then brought into the central position by the centring flaps 26, 27 which are opened by the fish on one side, so that the trunk of the fish can be delivered to the upper pair of circular blades 15, 16 in centred fashion. This operation of fine centring is coordinated in time in such a way that, by a kind of zip fastener principle, teeth 40 are always engaged with the centre bone 22 and so ensure transport.

Lifting off of the centre bone 22 can be done in different ways. In the embodiment according to FIGS. 1 to 3 the trunk of the fish is lifted by active control of the guide elements 29, 30. Due to the linear and/or rotational movement of the guide elements 29, 30 or parts thereof, the trunk of the fish can be specifically released from the supporting edge 21. In the embodiment according to FIG. 4 the trunks of the fish are lifted by the raised area 33 when they run onto the guide elements 29, 30 or onto their guide surfaces. In the embodiment according to FIG. 5, the guide rocker 39 is responsible for lifting the trunks of the fish. The guide rocker 39 is held e.g. by a spring element in an upper position against a stop. This stop is selected so that there is no impairment of cutting free of the ventral bones, that is, the so-called tail cut. To put it another way, the stop is set so that the upper edge of the guide rocker 39 lies below the supporting edge 21. As soon as the ventral bones are cut free, either the stop can be displaced upwards, so that the trunk of the fish is lifted off the centre bone 22 when it passes the guide rocker 39. Another possibility lies in actively moving the guide rocker 39 upwards in order thus to lift the centre bone 22 beyond the supporting edge 21. Passive lifting of the centre bone 22 is achieved when the supporting body 13 according to FIG. 6 is used. Due to the different tooth heights, the front teeth 40 in the region of the beak 25 are permanently engaged with the centre bone 22. The lower teeth 40 in the region of the head lie below the guide surfaces e.g. of the guide elements 29, 30, so that the centre bone 22 slides over the guide surfaces, while the teeth 40 in this region carry on below the guide surfaces.

The method according to the invention can also be carried out without cutting free the ventral bones. The ventral bones and the dorsal bones can also be cut free at the same time. In this case lifting of the centre bone 22 and centring on the supporting body 13 are effected before the cutting unit 11, that is, before both pairs of circular blades 15, 16; 18, 19. A crucial factor during the lifting of the centre bone 22 is the region of the belly cavity, that is, the region with which the trunk of the fish rests on the supporting body 13. If the circular blades 15, 16; 18, 19 are located one above the other, the trunk of the fish and in particular the centre bone 22 are lifted when it enters the lateral centring flaps 41, 42, and centred in synchronisation. The centring rollers 43 erect the trunk of the fish due to their conical shape. The further centring flaps 45, 46 hold the trunk of the fish centrally in synchronisation, while the holding rollers 44 push the trunk of the fish downwards. During further travel, the fin erectors erect the fins before the trunk of the fish is delivered to the circular blades 15, 16; 18, 19.

The invention claimed is:

1. Apparatus for filleting beheaded and gutted fish, comprising a cutting unit for filleting the fish, wherein the cutting unit has at least one pair of circular blades, an endlessly rotating transport conveyor having at least one saddle-shaped supporting body for receiving the fish and conveying them through the cutting unit tail first, wherein each supporting body has a supporting edge for making a form-locking connection with the centre bone of the fish to be processed, and a device for centring the centre bone in relation to the supporting body, wherein a means for lifting the centre bone of the fish off the supporting edge of the supporting body is provided, which is arranged in the region of the device for centring the centre bone.

2. Apparatus according to claim 1, wherein the cutting unit comprises a lower pair of circular blades for cutting free the ventral bones and an upper pair of circular blades for cutting free the dorsal bones, wherein the upper pair of circular blades is arranged behind the lower pair of circular blades in the direction of transport T of the fish tail first, and the means for lifting the centre bone off is a means for lifting the centre bone and extends on both sides of the lower pair of circular blades in the direction of transport T from the lower pair of circular blades to the upper pair of circular blades.

3. Apparatus according to claim 1, wherein the lifting-off means is arranged below the device for centring the centre bone.

4. Apparatus according to claim 1, wherein the means for lifting the centre bone off comprises two guide elements which each have a raised area to form an uneven guide surface, wherein the raised area protrudes beyond the supporting edge of the supporting body in the direction of the device for centring the centre bone.

5. Apparatus according to claim 4, wherein the guide elements have a circle segment-shaped section and a linear section, wherein the linear section runs parallel to the direction of transport T.

6. Apparatus according to claim 5, wherein the raised area is formed in the linear section of the respective guide element.

7. Apparatus according to claim 5, wherein the raised area extends over part of the length of the linear section in the direction of transport T.

8. Apparatus according to claim 1, wherein the means for the lifting the centre bone off comprises two guide elements which are each designed planar in the direction of transport T to form a completely planar guide surface, and cooperate with the supporting body in such a way that the supporting edge of the supporting body has a single-row tooth arrangement, wherein the height of the teeth in the front region of the supporting body, seen in the direction of transport T, is greater than in the rear region, so that the teeth of the rear region lie below the plane spanned by the guide surfaces.

9. Apparatus according to claim 1, wherein the lifting-off means is designed to be movable up and down.

10. Apparatus according to claim 9, wherein the guide elements are individually controllable to alter their position.

11. Method for filleting beheaded and gutted fish, having the steps of:
transporting a fish resting with its centre bone on a supporting edge of a supporting member with its back at the top, tail first through an apparatus for filleting fish, wherein during transport
the dorsal back bones are cut free by means of a pair of circular blades, wherein the centre bone of the fish is lifted off the supporting edge of the supporting body before the dorsal bones are cut free, and then centred centrally to the supporting edge.

12. Method according to claim 11, wherein, before the dorsal back bones are cut free, first the ventral belly bones are cut free by means of a second pair of circular blades.

13. Method according to claim 11, wherein the centre bone is lifted off below centring flaps and, after lifting off, centred by the centring flaps.

14. Method according to claim 11, wherein the centre bone is lifted actively by guide elements and/or raised areas associated with the guide elements.

15. Method according to claim 11, wherein the centre bone is actively lifted by a guide rocker mounted in front of the pair of circular blades for cutting free the ventral bones.

16. Method according to claim 11, wherein the centre bone is passively lifted by running onto guide surfaces formed by guide elements.

* * * * *